(12) United States Patent
Nürnberg (10) Patent No.: US 9,919,483 B2
(45) Date of Patent: Mar. 20, 2018

(54) METHOD FOR MANUFACTURING A PANEL FOR A BALL

(71) Applicant: adidas AG, Herzogenaurach (DE)

(72) Inventor: Hans-Peter Nürnberg, Gutenstetten (DE)

(73) Assignee: adidas AG, Herzogenaurach (DE)

(*) Notice: Subject to any disclaimer, the term of this patent is extended or adjusted under 35 U.S.C. 154(b) by 0 days.

(21) Appl. No.: 15/167,630

(22) Filed: May 27, 2016

(65) Prior Publication Data

US 2016/0347010 A1  Dec. 1, 2016

(30) Foreign Application Priority Data

May 28, 2015  (DE) .................. 10 2015 209 797

(51) Int. Cl.
*B29C 45/14* (2006.01)
*B29C 70/70* (2006.01)
(Continued)

(52) U.S. Cl.
CPC .............. *B29C 70/70* (2013.01); *A63B 41/02* (2013.01); *A63B 41/08* (2013.01); *A63B 45/00* (2013.01); *A63C 1/00* (2013.01); *B29C 39/00* (2013.01); *B29C 45/14* (2013.01); *B29C 45/1671* (2013.01); *B29C 51/10* (2013.01); *B29C 70/88* (2013.01); *B29D 22/02* (2013.01); *B29D 22/04* (2013.01); *B32B 1/00* (2013.01); *B32B 5/02* (2013.01); *B32B 5/18* (2013.01); *B32B 7/02* (2013.01); *B32B 7/12* (2013.01); *B32B 27/12* (2013.01); *B32B 27/40* (2013.01);
(Continued)

(58) Field of Classification Search
None
See application file for complete search history.

(56) References Cited

U.S. PATENT DOCUMENTS 3,246,066 A * 4/1966 Gits ................. B29C 39/00
264/132
3,363,039 A * 1/1968 Nagai ................. B29C 45/16
249/156
(Continued)

FOREIGN PATENT DOCUMENTS

DE  10 2009 016 287 B3  11/2010
DE  102 55 092 B4  11/2010
(Continued)

OTHER PUBLICATIONS

Extended European Search Report issued in European Application No. 16171691.5, dated Aug. 10, 2016, 11 pages.

*Primary Examiner* — Edmund Lee
(74) *Attorney, Agent, or Firm* — Sterne, Kessler, Goldstein & Fox P.L.L.C.

(57) ABSTRACT

Methods for manufacturing a panel for a ball, in particular for a soccer ball, as well as panels manufactured by these methods and balls with such panels. A method comprises the following steps: providing a carrier material having an outer side and an inner side within a mold having at least one first and at least one second mold part. Three-dimensionally molding an outer layer of the panel on the outer side of the carrier material within the mold. Three-dimensionally molding an inner layer of the panel on the inner side of the carrier material using at least the first mold part.

16 Claims, 2 Drawing Sheets

(51) Int. Cl.
*B29C 51/10* (2006.01)
*A63B 41/08* (2006.01)
*A63B 45/00* (2006.01)
*B29C 45/16* (2006.01)
*B29D 22/02* (2006.01)
*A63B 41/02* (2006.01)
*B29C 70/88* (2006.01)
*B29D 22/04* (2006.01)
*A63C 1/00* (2006.01)
*B32B 5/02* (2006.01)
*B32B 5/18* (2006.01)
*B32B 7/02* (2006.01)
*B32B 7/12* (2006.01)
*B29C 39/00* (2006.01)
*B32B 27/12* (2006.01)
*B32B 27/40* (2006.01)
*B32B 1/00* (2006.01)
*B29L 31/54* (2006.01)
*B29K 75/00* (2006.01)
*B32B 37/10* (2006.01)
*B32B 38/18* (2006.01)

(52) U.S. Cl.
CPC ............ *B29C 45/1418* (2013.01); *B29C 2045/14213* (2013.01); *B29K 2075/00* (2013.01); *B29K 2995/0026* (2013.01); *B29L 2031/545* (2013.01); *B32B 37/10* (2013.01); *B32B 38/1866* (2013.01); *B32B 2266/0278* (2013.01); *B32B 2266/0292* (2013.01); *B32B 2274/00* (2013.01); *B32B 2305/022* (2013.01); *B32B 2307/402* (2013.01); *B32B 2307/412* (2013.01); *B32B 2307/536* (2013.01); *B32B 2307/75* (2013.01); *B32B 2607/00* (2013.01)

(56) References Cited

U.S. PATENT DOCUMENTS

| | | | | |
|---|---|---|---|---|
| 4,704,176 A * | 11/1987 | Botzman | ............ | C08J 5/12 156/123 |
| 5,225,264 A * | 7/1993 | Kato | ............ | A47B 96/206 428/106 |
| 5,296,183 A * | 3/1994 | Carbone | ............ | B29C 45/14311 264/131 |
| 5,338,592 A * | 8/1994 | Ohsumi | ............ | B29C 45/14811 156/153 |
| 5,525,179 A * | 6/1996 | Stickling | ............ | B29C 45/1679 156/245 |
| 5,649,701 A | 7/1997 | Mills et al. | | |
| 5,938,881 A * | 8/1999 | Kawata | ............ | B29C 43/203 156/307.4 |
| 6,036,908 A * | 3/2000 | Nishida | ............ | B29C 45/1671 264/254 |
| 6,261,400 B1 | 7/2001 | Kennedy, III | | |
| 6,432,343 B1 * | 8/2002 | Zollondz | ............ | B29C 39/021 264/255 |
| 6,875,301 B2 * | 4/2005 | Kauppi | ............ | B29C 45/14688 156/245 |
| 7,066,853 B2 | 6/2006 | Chang | | |
| 7,704,427 B2 * | 4/2010 | Fujii | ............ | B29C 45/1671 264/248 |
| 7,887,741 B2 * | 2/2011 | Kato | ............ | B29C 45/1418 264/255 |
| 8,092,733 B2 * | 1/2012 | Hayes | ............ | B29C 45/1671 264/241 |
| 8,287,789 B2 * | 10/2012 | Zollner | ............ | B29C 45/1671 264/255 |
| 8,454,348 B2 | 6/2013 | Brown et al. | | |
| 8,602,927 B2 | 12/2013 | Marc | | |
| 8,764,581 B2 | 7/2014 | Ichikawa | | |
| 2003/0195059 A1 | 10/2003 | Brum et al. | | |
| 2004/0125023 A1 * | 7/2004 | Fujii | ............ | B29C 45/1671 343/700 MS |
| 2006/0226570 A1 * | 10/2006 | Case | ............ | A61F 2/34 264/162 |
| 2009/0020911 A1 * | 1/2009 | Sullivan | ............ | A63B 37/0063 264/265 |
| 2009/0026197 A1 * | 1/2009 | Chou | ............ | A45C 7/0036 220/9.2 |
| 2010/0109191 A1 * | 5/2010 | Wu | ............ | B26F 1/40 264/265 |
| 2014/0179469 A1 | 6/2014 | Berggren et al. | | |

FOREIGN PATENT DOCUMENTS

| | | |
|---|---|---|
| DE | 10 2012 206 094 A1 | 10/2013 |
| EP | 1 424 105 A1 | 6/2004 |
| EP | 2 649 896 A2 | 10/2013 |

* cited by examiner

FIG 2

METHOD FOR MANUFACTURING A PANEL FOR A BALL

FIELD

Embodiments of the present invention relate to panels for a ball, in particular for a soccer ball, a ball with such panels as well as a method for manufacturing such panels.

BACKGROUND

Balls, in particular sports balls, such as soccer balls, often comprise a cover having a plurality of panels, which may be stitched to each other, glued together or joined otherwise. Meanwhile panels are mostly manufactured from plastics, but they may also comprise natural leather.

DE 102 55 092 B4 describes a method for manufacturing three-dimensional panels of a ball, wherein said panels comprise an outer material and a support material.

Important factors when manufacturing panels are e.g. the aerodynamic and haptic properties of the ball manufactured from the panels. In particular in the case of soccer balls, it has turned out that a surface of the ball which is too smooth may have a negative influence on the flying properties and, for example, may lead to a "fluttering" of the ball. In addition, the surface of balls should provide sufficient friction to prevent the ball from slipping, e.g. from the foot in the case of a soccer ball, or from the hand etc. in the case of a handball or other balls. For this purpose, different approaches are known from the prior art to accordingly design the surfaces of balls or of individual panels.

DE 10 2009 016 287 B3 describes an inflatable ball, in particular a soccer ball, having an outer cover comprising a plurality of panels, the panels being connected with each other by sutures and each panel comprising at least one pseudo-suture which extends at least along a part of the outer surface of the panel.

Another factor to be considered when manufacturing panels for balls is the optical design of the panels or the balls. For optically designing balls, the surface of panels or also of a fully assembled ball may, for example, be printed or sprayed on. In this regard, however, the optical designs are quickly deteriorated by abrasion under the influence of kicks, impacts, hitting the ground etc.

U.S. Pat. No. 5,649,701 discloses panels for a ball with a transparent cover layer onto which further layers are laminated. U.S. Pat. No. 8,602,927 B2 discloses cover panels for a ball which are heat bonded to a reinforcement material. Further balls with panels are disclosed in U.S. Pat. No. 7,066,853 B2 and U.S. Pat. No. 6,261,400 B1. U.S. Pat. No. 8,454,348 B2 and U.S. Pat. No. 8,764,581 B2 disclose different methods for manufacturing balls without panels.

A disadvantage of the known panels is that for providing desired optical, haptic and aerodynamic properties, a plurality of separately manufactured elements are necessary. After having been manufactured, these separately manufactured elements are joined, e.g. laminated or bonded. As a result, manufacturing a panel requires a plurality of manufacturing apparatuses and different manufacturing steps, which makes production complex and expensive. Moreover, the separate elements often have to be manually inserted into corresponding apparatuses or removed from them, so that the manufacture is also labor-intensive. By the plurality of separately manufactured and joined elements, also the constructive design of the panels becomes more complicated, which may negatively influence the endurance and durability of the ball.

Based on this prior art, it is an object of the present invention to provide a simplified method for manufacturing panels, which nevertheless allows to advantageously influence the optical, haptic and/or aerodynamic properties of the panels and at the same time provide high durability of the panels and the balls manufactured therefrom vis-à-vis external influences.

BRIEF SUMMARY OF THE INVENTION

This object is at least partially achieved by a method for manufacturing a panel for a ball, in particular for a soccer ball. In an embodiment, the method comprises providing a carrier material having an outer side and an inner side within a mold having at least one first and one second mold part. On the outer side of the carrier material, an outer layer of the panel is three-dimensionally molded within the mold. In addition, on the inner side of the carrier material an inner layer of the panel is three-dimensionally molded using at least the first mold part.

The mentioned method enables manufacturing three-dimensionally molded panels for a ball with a minimum number of manufacturing steps. Separately molding a plurality of elements and subsequently attaching the molded elements to each other is not necessary. Rather, the inner layer and the outer layer of the panel are integrally three-dimensionally molded in one manufacturing step at the carrier material. The inner or outer sides of the panel can thus be efficiently provided with the different desired properties. For example, three-dimensionally molding the outer layer and/or the inner layer on the carrier material may be carried out by injection molding.

Generally, it is possible to dispense with the carrier material. For example, it would be possible to integrally three-dimensionally mold the inner layer and the outer layer of the panel directly adjacent to each other. In this case, the inner and/or outer layer may for example be provided as a foil or a textile material.

The inner layer may e.g. be optimized such that specific cushioning and bouncing properties are provided. The outer layer, on the other hand, may e.g. be aimed at providing a sealing which prevents moisture from the outside from entering and/or offers protection from abrasion. By using at least one mold part for molding the inner and the outer layer, it becomes possible to provide the panel with different desired properties on the inside and the outside, wherein the panel may simultaneously remain in the mold during manufacture. A simpler and faster manufacture is thus enabled, which may dispense with manual operation. Furthermore, the panel manufacture may thus be quickly adapted to individual customer wishes.

By manufacturing the multi-layer panel with at least one joint mold part for several molding steps, the method according to embodiments of the invention enables an efficient automated production process with short production times. Thus, a high degree of flexibility regarding design and production is provided.

In addition, by integrally manufacturing the panels by means of the mentioned method, waste can be avoided, as it is not necessary to cut separately produced layers or elements to match each other. Rather, the inner and outer layers are molded into the desired three-dimensional shape directly on a carrier material. Thus, cutting waste can be avoided. At most, it may be necessary to cut the carrier material, for example after molding the inner and outer layer. However, cutting the carrier material may be avoided as well if the carrier material is already provided with fitting dimensions within the mold. Moreover, the carrier material may be three-dimensionally molded already before it is provided within the mold. Altogether, the panels may be manufactured in a more environmentally friendly and cost-saving manner. Furthermore, no semi-finished materials are necessary for cutting the panels. Consequently, by the method according to embodiments of the invention, more efficient and sustainable manufacture of panels is enabled.

By the method according to embodiments of the invention, panels of any shape may be individually manufactured. A panel of almost any outer contour and almost any cross-section may thus be produced by means of the method. The outer contour/cross-section of the panels is predeterminable and adjustable by means of the mold parts. For example, the mold parts may comprise exchangeable inserts, for example of silicone and/or ceramic and/or metal, by means of which the cavities or indentations formed by the mold parts may be individually adapted. The panel manufacture may thus be adapted to individual customer wishes.

By integrally manufacturing the panel, the method according to embodiments of the invention can completely dispense with adhesives, bonding agents, or the like. No separate adhesives need to be applied to join the individual layers of the panel. The materials used for the individual layers of the panel are compatible with each other and, according to some examples, may be joined solely by means of thermal and/or mechanical energy. Furthermore, it is also possible to join the used materials by means of chemical reactions. A bonding is enabled by affinity of the used materials. However, should it be advantageous for the panel to be manufactured, adhesives, bonding agents or the like may be used alternatively.

By using an at least partially transparent outer layer, the carrier material may furthermore be used for providing the panel with a desired optical design protected from abrasion. For example, the carrier material may comprise a desired color. In addition, by means of a suitable combination of a carrier material and an at least partially transparent material for the outer layer, optical effects which appear three-dimensional may be achieved, as explained later in more detail.

Moreover, it has turned out that by means of the described method, panels may be manufactured with suitable materials which are hardly prone to wrinkling. This has the enormous advantage that balls manufactured with such panels do not have to be transported in the inflated state. Rather, they may be transported in a space-saving manner in the deflated state. For example, they may be inflated only on site, e.g. in retail stores or at the end customer, without permanent wrinkles or cracks being caused by the transport in the deflated state. The balls may thus be delivered in a significantly more environmentally friendly and cost-effective manner.

The method according to embodiments of the invention also allows manufacturing the panels independently of a ball bladder or a carcass. This way it is possible for the panels and the bladder or the carcass to be manufactured at different locations and to be joined only at the end customer. Consequently, the panels may be individually delivered to where they are needed.

The three-dimensionally molding the outer layer and the inner layer each include three-dimensionally molding a material applied to the carrier material. Material for the outer layer and/or the inner layer may be applied to the carrier material by e.g. injection molding and three-dimensionally molded. Alternatively, the respective material may also be otherwise introduced into the mold, e.g. cast or inserted.

Three-dimensionally molding the inner and/or the outer layer may each be carried out at a certain temperature and/or a certain temperature profile. For example, at least one of the mold parts of the mold may be heated or cooled. This way the three-dimensionally molding may be supported by targeted heating or cooling of the respective material to be molded. For example, heating may be performed prior to and/or during the three-dimensionally molding, and/or cooling may be performed after the three-dimensionally molding.

The inner layer may have a thickness of e.g. 1 mm to 15 mm or 4 mm to 10 mm or approximately 7 mm. The outer layer may have a thickness of e.g. 0.05 mm to 5 mm or 0.1 mm to 2 mm or approximately 0.5 mm. By means of the method according to embodiments of the invention, it is possible to individually adapt the thickness of the inner layer or the thickness of the outer layer and tailor it to the respective requirements of the ball for which the panels are intended to be used.

The carrier material may remain within the at least one first of the at least two mold parts between the three-dimensionally molding the outer layer and the three-dimensionally molding the inner layer. In the course of this, the outer layer may be three-dimensionally molded prior to, after, simultaneously or at least partly simultaneously with the inner layer. Accordingly, material for the inner layer may be applied to the carrier material prior to, after, simultaneously or also at least partly simultaneously with the material for the outer layer. By the carrier material remaining in the at least one mold part, efficient manufacturing is enabled. A removal from a mold part (e.g. for manufacturing the inner layer) and a subsequent insertion into another mold part (e.g. for manufacturing the outer layer) is no longer required.

The three-dimensionally molding the inner layer may be carried out such that the inner layer is enclosed by the carrier material at an outer face and at side faces of the inner layer. This way it can be ensured that the inner layer is enclosed by the carrier material on all sides—except its inner side, which may e.g. be intended for being attached to a bladder for a ball. The inner layer may thus be comprehensively protected by the carrier material from external influences such as moisture or friction. This may be achieved e.g. by providing the carrier material with a three-dimensional shape, e.g. with an indentation on its inner side. The material for the inner layer may then be inserted into said indentation and three-dimensionally molded such that its outer face and its side faces are enclosed by the carrier material.

Arranging the carrier material around the outer and side faces of the inner layer furthermore enables the inner layer to be enclosed on all these sides also by the outer layer arranged on the outer side of the carrier material. In particular, this enables manufacturing a panel whose inner layer is protected by the carrier material and the outer layer both on the outer face and on the side faces. Fraying or tearing of the panel on its side faces may thus be strongly suppressed.

The three-dimensionally molding the outer layer may be carried out such that the inner layer is enclosed by the outer layer at an outer face and at side faces of the inner layer. As already explained, this enables protection of the panel by the outer layer both at the outer face and at the side faces of the panel. Furthermore, it is enabled this way to join a plurality of panels at their side faces via the outer layer. The material of the outer layer may be optimized for this purpose and enable a particularly good bonding, e.g. by means of infrared welding etc.

The inner layer may at least in part be molded by a third mold part, which is not used for the three-dimensionally molding the outer layer. For example, the at least one first mold part and at least one second mold part may be used for molding the outer layer. Instead of the at least one second mold part, at least one third mold part together with the at least one first mold part may be used for molding the inner layer. For example, the first and the second mold part may be designed such that they form a cavity for the three-dimensionally molding an outer layer, the cavity being designed such that an indentation is formed in the carrier material arranged under the outer layer. To this end, the at least one second mold part may e.g. be formed as a die element which is pressed onto the first mold part. Alternatively or additionally, the carrier material may be separately three-dimensionally molded or already be provided three-dimensionally molded. The at least one third mold part may be designed such that the indentation formed in the carrier material is filled with material for the inner layer. Combining a "new" third mold part with the first mold part, within which the panel may remain, allows simplified manufacturing, which may nevertheless take account of different geometries of the outer and inner layer of the panel. In particular, the inner face of the inner layer may be designed such that it comprises an evenly curved surface, which is adapted to a curvature of a ball to which the panel is to be attached.

Material for the inner layer may be applied to the carrier material through the third mold part. The third mold part may e.g. directly serve as a gate for injection molding, with flowable material being applied to the carrier material through the third mold part. The third mold part may comprise one or more openings. Therefore, the remaining mold parts do not need to be designed for applying material for the inner layer. Instead, it may be sufficient that the third mold part used for the three-dimensionally molding the inner layer is simultaneously also designed for introducing the corresponding material.

The inner layer may comprise polyurethane or foamed polyurethane, in particular expanded thermoplastic polyurethane. Polyurethane, in particular foamed polyurethane or expanded thermoplastic polyurethane enable providing good cushioning properties. Especially expanded thermoplastic polyurethane offers cushioning properties that are constant over a large temperature range and do not noticeably decrease over the lifetime of a ball. In general, polyurethane may be easily three-dimensionally molded, e.g. by injection molding. Also expanded thermoplastic polyurethane, e.g. in the form of pellets, may be easily three-dimensionally molded. In this regard, reference is made by way of example to patent applications DE 10 2012 206 094 and EP 2 649 896. Moreover, by using expanded thermoplastic polyurethane, the already-explained low tendency of the panel to wrinkle is further reduced. In other examples, e.g. other foamed plastic materials may be used as well, e.g. foamed ethylene-vinyl acetates and/or other expanded plastic materials, e.g. expanded ethylene-vinyl acetates and/or expanded polyether block amide. Furthermore, e.g. various PU systems may also be used for the inner layer, for example two-component PU systems. PU systems are particularly well adaptable to different requirements.

Material for the outer layer may be applied to the carrier material through the at least one first of the at least two mold parts. Similarly as explained with regard to the optional third mold part for the inner layer, the at least one first mold part may thus e.g. serve as a gate for injection molding, wherein flowable material is applied to the carrier material through the first mold part. The first mold part may comprise one or more openings for this purpose. Therefore, the remaining mold parts do not need to be designed for applying material for the outer layer.

Generally it is possible to apply a plurality of different layers or a plurality of different outer layers to the carrier material through the at least one first mold part. It is conceivable, for example, to successively apply different outer layers which differ with regard to the materials used and/or the material properties. For this purpose, the first mold part may comprise openings at different locations through which flowable material may be applied to the carrier material. It is possible that the individual layers or outer layers only differ with regard to their color design. Alternatively, it is for example generally also possible to replace the first mold part with a further mold part in order to apply further layers or outer layers.

Furthermore, it is possible to insert a structure element into the mold before the three-dimensionally molding the outer layer. For example, such a structure element may be inserted into the first mold part before applying the flowable material. The structure element may be surrounded by the flowable material applied to the carrier material through the first mold part and thus be embedded in the outer layer. The structure element may, for example, be a textile element, for example a knitted fabric, a weft-knitted fabric, a warp-knitted fabric, a mesh and/or a woven fabric.

Alternatively, it is also possible that the structure element is not embedded in the outer layer but used for flexibly creating textures or undercuts in the outer layer. In this process, an outer contour of the structure element predetermines the texture of the outer layer. Such a structure element may, for example, be formed of ceramic, silicone and/or metal. The properties of the structure element are such that it is easily possible to demold the outer layer after the three-dimensionally molding the same. Such structure elements may be designed as desired in order to flexibly introduce desired textures into the outer layer. In the same manner, such structure elements may be used in connection with applying the inner layer or in connection with the third mold part.

The outer layer may comprise polyurethane, in particular transparent polyurethane or polyurethane which is at least partially transparent for visible light. The polyurethane of the outer layer may particularly be optimized with respect to providing high abrasion resistance and/or a particular static friction, which transparent polyurethanes are particularly also suitable for. In particular, the use of transparent polyurethane furthermore enables optically designing the panel by means of the carrier material, with the optical design of the panel simultaneously being protected from abrasion. By an interaction between the transparent outer layer and the carrier material, optical effects which appear three-dimensional may also be provided in this process. For example, the outer layer and/or the carrier material may also comprise textures apart from a corresponding color design of the outer layer and/or the carrier material. Furthermore, e.g. various PU systems may also be used for the outer layer, for example two-component PU systems. PU systems are particularly well adaptable to different requirements.

The mentioned methods may also comprise a three-dimensionally molding the carrier material within the mold and/or using at least one of the at least two mold parts. Thus, also the carrier material may be three-dimensionally molded within the same apparatus—just as the inner and outer layer applied to the carrier material. For example, the carrier material may be provided as a foil which is three-dimensionally molded. Such foil may either be provided with or without textures and alternatively or additionally may be printed on. Moreover, it is possible to provide the carrier material in flowable form, with the carrier material then being three-dimensionally molded within the mold and subsequently being provided in solidified form. The three-dimensionally molding the carrier material may e.g. be carried out before the three-dimensionally molding the inner layer and/or before the three-dimensionally molding the outer layer. The inner layer and/or the outer layer may then be molded on the three-dimensionally molded carrier material.

The provided carrier material may have a thickness of e.g. 0.05 mm to 0.6 mm or 0.05 mm to 0.4 mm or approximately 0.1 mm or approximately 0.2 mm. The carrier material may e.g. be provided as a foil, e.g. a plastic foil, which e.g. comprises acrylonitrile butadiene styrene and/or thermoplastic polyurethane. The carrier material may also comprise polyamide. A plastic foil may also comprise a base layer from the mentioned materials, to which another layer is applied, which e.g. comprises thermoplastic polyurethane. The latter may be formed as a decoration layer and optically designed accordingly, e.g. printed on. The base layer and the decoration layer may each have a thickness of 1 μm to 200 μm or 50 μm to 100 μm. Alternatively or additionally, the decoration layer may be formed as a reflecting layer. Optionally, e.g. on the inner side, the carrier material may comprise a textile material as a textile carrier. The textile material may, for example, be a knitted, weft-knitted, plaited and/or woven material and/or a non-woven material. Generally, it is also possible for the carrier material to be essentially entirely formed from a textile material. Moreover, the carrier material may be designed such that it co-determines certain mechanical functions of the panel.

The three-dimensionally molding the carrier material may comprise suctioning of the carrier material to at least one mold part. The carrier material may thus be three-dimensionally molded in accordance with the mold part. For example, the carrier material may be sucked to a mold part by applying negative pressure, e.g. to a second mold part used together with the at least first mold part, and thus be pressed against said mold part. In this regard, the carrier material may assume the texture of the mold part used.

The three-dimensionally molding the carrier material may alternatively or additionally also comprise pressing with a die element. For example, a second mold part used together with the at least first mold part may be formed as a die element, which is pressed against the at least first mold part. This way the carrier material may be three-dimensionally molded in accordance with the shape of the die element and the corresponding counter die.

Alternatively or additionally, the three-dimensionally molding the carrier material may also comprise a deep-drawing the carrier material into the mold.

The three-dimensionally molding the carrier material may be carried out at a certain temperature and/or a certain temperature profile. For example, at least one of the mold parts of the mold may be heated or cooled. This way the three-dimensionally molding may be supported by targeted heating or cooling of the carrier material, as already explained with regard to the inner and outer layer of the panel.

The described methods may also comprise printing on the carrier material. The printing may e.g. be carried out before providing the carrier material within the mold. For example, the carrier material may be provided as a printed foil. The carrier material may thus be used for optically designing the panel in a desired manner. It is possible for the carrier material to be printed on its outer side. When using an at least partly transparent carrier material, however, the printing may also be carried out on its inner side.

The mentioned methods may further comprise creating textures on the outer side and/or on the inner side of the carrier material and/or an outer face and/or side faces of the outer layer. For example, textures formed as pseudo-sutures and/or textures for increasing a static friction of the panel on the outer face of the outer layer may be provided. Alternatively or additionally, textures on the carrier material may be provided for improving adhesion on the outer and/or inner layer formed thereon. Textures on the outer side of the carrier material and/or the outer face of the outer layer, however, may alternatively or additionally also serve for creating optical effects which appear three-dimensional. Alternatively or additionally, textures may also be created on an inner face of the inner layer. These may e.g. increase the adhesion of the inner face on a bladder and/or a carcass for a ball. A major advantage of the method according to embodiments of the invention is that any texture may be created completely within the used mold. Subsequent texturizing of the manufactured panels is not necessary.

Textures may have a depth of approximately 0.01 mm-1.5 mm, but may also extend further in their length and/or width. A width of the textures may be approximately 2.5 mm-3.5 mm. These dimensions are suitable for providing desired aerodynamic and/or haptic properties. To provide aerodynamic properties, particularly a depth of 0.1 mm-1.5 mm is useful. To provide haptic properties, for example, a depth of 0.01 mm-0.1 mm is useful.

Furthermore, textures may also comprise dimensions, in particular depths, of less than 0.1 mm to influence the optical properties of the carrier material and/or of the outer layer, for example by refraction of light. This may particularly support providing effects which appear three-dimensional. In this regard, e.g. upon incidence of light, a change in color of the outer layer may appear dependent on the depth of the respective textures. Moreover, textures may in different ways reflect, mirror, refract, scatter, etc. light impinging on the outer side of the carrier material and/or the outer layer.

The textures may be at least partly created by the mold comprising corresponding mold textures, e.g. indentations or protruding elements. For example, the textures may be created by the three-dimensionally molding the respective element, i.e. the carrier material, the inner layer and/or the outer layer. A separate working step for creating the textures is therefore not necessary. The mold parts by means of which the respective inner or outer layer or optionally the respective carrier material is three-dimensionally molded may comprise corresponding mold textures. Alternatively or additionally, textures may also at least partly be molded on the respective element by adding additional material after molding the respective element. Alternatively or additionally, textures may e.g. be created during the three-dimensionally molding by high-pressure molding, e.g. with a focused high-pressure gas jet.

According to an embodiment, a method for manufacturing a panel for a ball, in particular for a soccer ball, comprises the following steps: three-dimensionally molding a carrier material having an outer side and an inner side within a mold having at least two mold parts; three-dimensionally molding an outer layer (or an inner layer) of the panel on the outer side (or the inner side) of the carrier material within the mold; three-dimensionally molding an inner layer (or an outer layer) of the panel on the inner side (or the outer side) of the carrier material using at least one first of the at least two mold parts.

Another embodiment of the present invention relates to a panel for a ball, in particular for a soccer ball, which is manufactured or may be manufactured by means of one of the methods described herein.

Finally, another embodiment of the present invention relates to a ball, in particular a soccer ball, having a plurality of panels as described herein.

Such a ball may comprise a bladder filled with air.

BRIEF DESCRIPTION OF THE FIGURES

Possible embodiments of the present invention are further described in the following detailed description, with reference to the following Figures.

DETAILED DESCRIPTION OF THE INVENTION

It should be noted that only individual embodiments of the invention can be described in greater detail below. However, the person skilled in the art recognizes that the design possibilities described in relation to these specific embodiments may also be further modified and combined differently within the scope of the present invention and that individual features may also be omitted where they appear to be dispensable. In order to avoid redundancies, reference is particularly made to the explanations in the previous sections, which also remain applicable to the following detailed description. In particular, different of the aspects described in the following may be combined with the aspects that were already explained.

Figure 1:
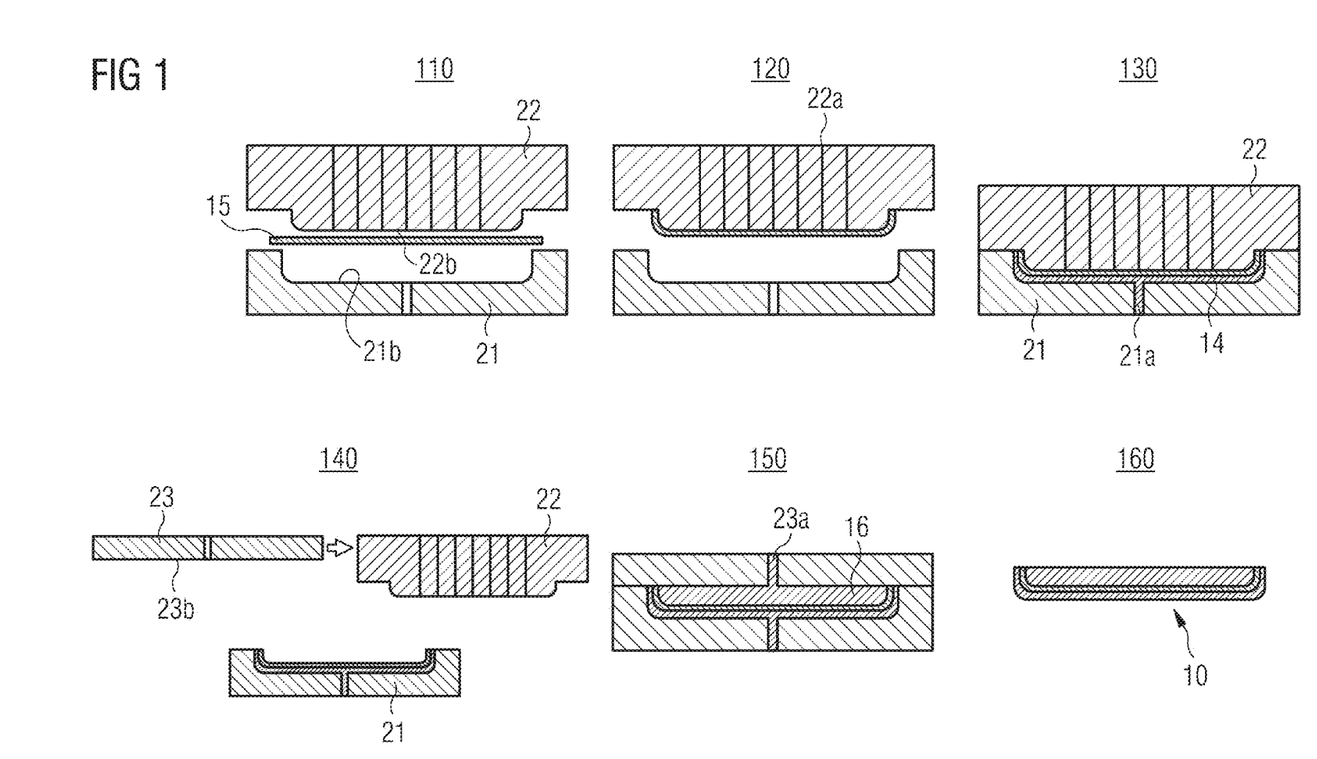
FIG. 1: An embodiment of a method for manufacturing a panel for a ball, in particular for a soccer ball.

FIG. 1 shows a schematic representation of a method for manufacturing a panel 10 for a ball, in particular for a soccer ball. In step 110, a carrier material 15 is provided within a mold. The carrier material comprises an outer side (arranged at the bottom in FIG. 1) and an inner side (arranged at the top in FIG. 1). The mold comprises a first mold part 21 and a second mold part 22. In other examples, further mold parts and/or differently designed mold parts may be provided. In particular, the first and the second mold part may also be joined mechanically. It is important for the mold parts to comprise mold surfaces 21b, 22b arranged movably to each other. The mold parts may comprise exchangeable inserts, for example of silicone and/or ceramic and/or metal, by means of which the mold parts may be modified. This way the cavities or indentations formed by the mold parts may be individually adapted.

According to FIG. 1, the carrier material 15 is provided in an opened state of the mold as a basically two-dimensional material within the mold. For example, the carrier material 15 may be provided as a foil or a film. In other examples, however, the carrier material 15 may also be provided as a different two-dimensional material; it may e.g. comprise a textile. It is also possible to use printed and/or otherwise optically designed two-dimensional materials, e.g. on their outer side. Finally, the carrier material 15 may e.g. alternatively also be provided as a flowable or granular material, e.g. in the form of pellets, within the mold.

In step 120, the provided two-dimensional carrier material 15 is optionally three-dimensionally molded. The second mold part 22 may e.g. comprise openings 22a, which may be formed as through holes or channels and through which negative pressure may be provided such that the carrier material is pressed to the second mold part 22. Already by this measure, the carrier material 15 may be molded three-dimensionally, e.g. according to the contours of the second mold part 22. Alternatively, openings, e.g. through holes or channels, may also be provided at the first mold part 21 for creating negative pressure. Alternatively or additionally to applying negative pressure, the three-dimensionally molding the carrier material 15 may also be achieved by pressing the carrier material 15. For this purpose, e.g. the second mold part 22 may be formed as a die element to press the carrier material 15 onto the first mold part 21. The three-dimensional shape of the carrier material 15 is then basically determined by the cavity formed between the second mold part 22 and the first mold part 21. This way e.g. also the thickness of the carrier material 15 may be changed. The three-dimensionally molding the carrier material 15 may also be carried out without suctioning, e.g. in the case of providing the carrier material 15 as a flowable or granular material. In this case, the flowable material may be solidified during the three-dimensionally molding the carrier material 15.

According to FIG. 1, the carrier material 15 is three-dimensionally molded such that it comprises at its inner side an indentation into which material for an inner layer may be introduced later.

The three-dimensionally molding the carrier material 15 may be optionally supported by being carried out at a certain temperature. For example, the second and/or the first mold part may be heated or cooled to a certain temperature. If desired, the temperature profile may be controlled during heating and/or or cooling the carrier material 15.

The first mold part 21 and/or the second mold part 22 may optionally comprise mold textures such that corresponding textures may be created in the pressed-on carrier material 15. For example, on the surface of the carrier material, elevations and/or indentations may be created. These may comprise the already mentioned dimensions. Such textures may e.g. improve bonding of an inner or outer layer of the panel to the carrier material. Moreover, such textures may be used for creating effects which appear three-dimensional on the outer side of the panel—in combination with an at least partly transparent outer layer.

In other examples, the carrier material 15 may be provided within the mold already three-dimensionally pre-molded and/or already having textures.

In step 130, material for an outer layer 14 of the panel 10 is introduced into the mold through one or more openings 21a of the first mold part. More precisely, the material is introduced into a cavity formed by the first mold part 21 and the second mold part 22 and applied to an outer side of the carrier material 15. The material may be cast or injected into the opening 21a in an e.g. flowable state. In other examples, the material for the outer layer 14 may also be otherwise introduced into the mold. For example, the second mold part 22 may alternatively or additionally to the first mold part 21 comprise one or more corresponding openings. However, the material may also be cast or otherwise introduced into the mold in an open state of the mold such that the mold parts do not necessarily have to comprise openings.

By the cavity formed between the first mold part 21 and the second mold part 22, the three-dimensional shape of the outer layer 14 may be predetermined such that the outer layer 14 may be three-dimensionally molded. The outer layer 14 may, as shown in FIG. 1, be completely arranged around the outer side of the carrier material 15 such that the outer side is completely protected by the outer layer 14. The outer layer 14 may be basically provided with even thickness. However, it is also possible to design the thickness of the outer layer 14 to vary.

According to FIG. 1, in steps 120 and 130 the same mold parts 21 and 22 are used. In other examples, the first mold part 21 used in step 120 may be replaced with another first mold part for step 130.

As already explained, textures may be created on the outer side of the outer layer 14. Said textures may be formed to improve the aerodynamic and/or haptic (e.g. static friction) and/or optical properties of the panel. The textures may be created e.g. by corresponding mold textures within the at least one first mold part 21. If desired, by means of these mold textures, corresponding textures in the carrier material 15 may already be created in step 120.

In step 140, the second mold part 22 is replaced with a third mold part 23 having a mold surface 23*b*. The first mold part 21 used for molding the outer layer, however, remains a part of the mold. Alternatively, second mold part 22 may be used. It may e.g. comprise plural mold surfaces 22*b* such that the same second mold part 22 may be used as a mold part in a different way. It is important that the carrier material 15 and the outer layer 14 formed thereon may remain within the first mold part 21, in particular its mold surface 21*b*, used for the three-dimensionally molding the outer layer 14, such that the workpiece does not need to be removed from the mold.

In step 150, material for an inner layer 16 of the panel 10 is introduced into the cavity formed by the first mold part 21 and the third mold part 23 and applied to an inner side of the carrier material 15 which has remained within the first mold part 21. The inner layer 16 is three-dimensionally molded in accordance with the cavity formed by the first mold part 21 and the third mold part 23 on the inner side of the carrier material 15. Also during this process, the at least one first mold part 21 and/or the at least one third mold part 23 may, as described with respect to the molding of the outer layer 14 and the mold parts 21, 22, be optionally heated and/or cooled.

The material for the inner layer may—as explained with respect to the material for the outer layer—be introduced into the mold e.g. in a flowable and/or granular state. For this purpose, e.g. the third mold part 23 may comprise one or more openings 23*a* through which the material is cast or injected. It is also possible to introduce the material for the inner layer 16 into the mold e.g. through openings in the form of pellets, e.g. pellets of expanded thermoplastic polyurethane. The pellets may e.g. be compounded into a homogenous foam by adding water vapor and/or heat, as e.g. described in DE 10 2012 206 094 and EP 2 649 896. For this purpose, the first mold part 21 and/or the third mold part 23 may comprise corresponding openings.

In other examples, the material for the inner layer 16 may also be otherwise introduced into the mold. For example, the first mold part 21 may alternatively or additionally to the third mold part 23 comprise one or more corresponding openings. However, the material may also be cast or otherwise introduced into the mold in an open state of the mold such that the mold parts do not necessarily have to comprise openings.

The inner layer 16 may, as e.g. shown in FIG. 1, may close an indentation formed by the inner side of the carrier material 15. Thus, a panel 10 may be provided, which is enclosed by the outer layer 14 and the carrier material 15 at its outer face and at its side faces, wherein the panel simultaneously comprises a back surface which is flat or e.g. evenly curved (for example corresponding to a curvature of the ball for which the panel is intended). As explained with regard to the outer layer 14, also inner layer 16 may be provided with a same or varying thickness.

Also third mold part 23 may optionally comprise mold textures such that corresponding textures may be created at the inner face of the inner layer 16. Such textures may e.g. improve adhesion of the inner layer on a bladder and/or a carcass for a ball.

Generally, it is also possible to mold further layers onto the panel 10 after the three-dimensionally molding the inner layer 16. For example, it is conceivable to replace the third mold part 23 with a fourth mold part. The first mold part 21 may remain a part of the mold. Alternatively, also third mold part 23 may be used to mold further layers. Generally, an additional inner layer could be injected onto inner layer 16 this way.

In step 160, the manufactured panel 10 is removed from the mold. Optionally, the finished panel 10 may be deburred.

A plurality of panels 10 manufactured this way may be arranged on an inflatable bladder for a ball provided with adhesive. For example, the bladder may be sprayed with a suitable glue. The adhesive may be cured by means of heat treatment such that a finished ball with a bladder and a plurality of (e.g. three or more) panels is provided.

Figure 2:
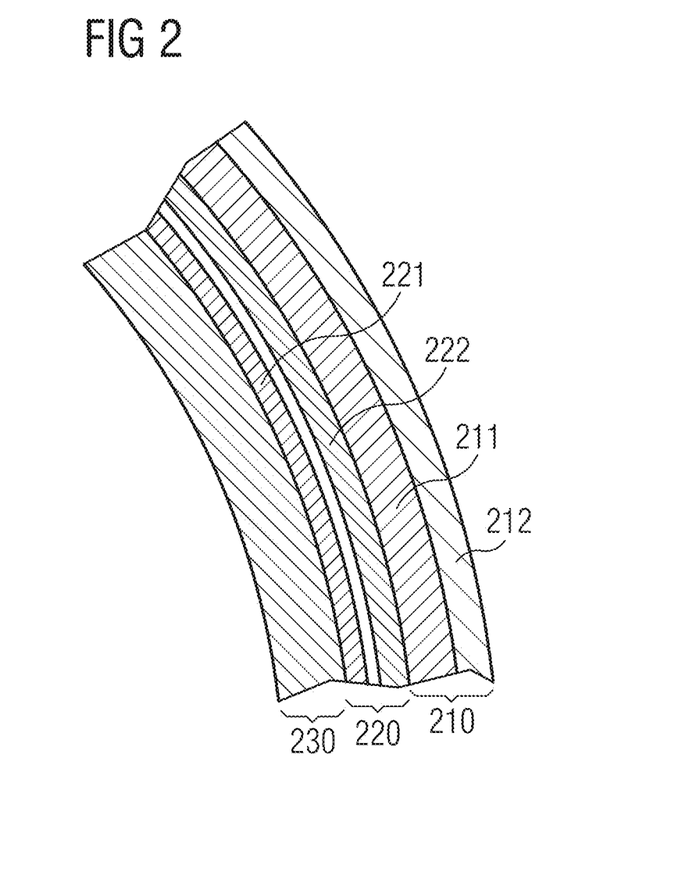
FIG. 2: A cross-section through an embodiment of a panel for a ball, in particular for a soccer ball.

FIG. 2 shows a schematic representation of a cross-section through a panel according to an embodiment of the present invention. The panel comprises a carrier material 220 and an outer layer 210 as well as an inner layer 230, which may be manufactured as already explained.

In particular, the outer layer 210 may be at least partly transparent. The at least partly transparent outer layer 210, however, may simultaneously comprise a certain coloring. On the outer side of the outer layer 210 textures 212 may be provided, which may serve for the already-explained purposes. The textures 212 may be created during the three-dimensionally molding the outer layer 210 and basically comprise the same material as a homogenous base layer 211 of the outer layer 210 arranged under the textures, as already explained with regard to FIG. 1. However, it is also possible to apply the textures from a thin layer from another material onto the base layer 211 of the outer layer 210. The material of the base layer 211 and the textures 212 may e.g. merely differ in coloring. Alternatively or additionally, the same material may be used, e.g. polyurethane, but with a different degree of hardness. However, it is also possible to use completely different materials. The three-dimensionally molding the outer layer may e.g. be designed as a method with two or more steps, wherein the material for the base layer 211 or the textures 212 is successively three-dimensionally molded.

Also the carrier material 220 may, as already explained, at its inner and/or outer side comprise textures 222, which may be created as explained with reference to FIG. 1 and may serve for the already-mentioned purposes. The textures 222 of the carrier material 220, however, may also be manufactured analogously as described with regard to the textures 212 of the outer layer 210. For example, they may be created during three-dimensionally molding the carrier material 220 and they may be composed of a different material than a base layer 221 of the carrier material 220. The three-dimensionally molding the carrier material may be accordingly designed in two or more steps.

According to FIG. 2, textures 222 are, by way of example, merely provided at the outer side of the carrier material 220. The material for such textures 222 of the carrier material 220 may e.g. be at least partly transparent. The base layer 221 of the carrier material 220 may e.g. be printed on or otherwise optically designed. Also the textures 222 of the carrier material 220 may be accordingly optically designed; they may e.g. be imprinted into the base layer 221 of the carrier material 220 such that they basically have the same color design as the base layer 221 of the carrier material. By combining the optical design of the carrier material 220 and/or its textures 222 with the transparent outer layer 210, which is optionally provided with a coloring, and/or the textures 212 of the outer layer 210, multiple options for optically designing the panel are provided; in particular, effects which appear three-dimensional may be created, as already explained.

Also the inner layer 230 may comprise a particular coloring and may—in combination with an at least partly transparent carrier material 220—also contribute to optically designing the panel.

What is claimed is:

1. A method for manufacturing a panel for a ball, the method comprising:
   providing a carrier material having an outer side and an inner side within a mold having at least one first mold part and at least one second mold part;
   three-dimensionally molding an outer layer of the panel on the outer side of the carrier material within the mold;
   three-dimensionally molding an inner layer of the panel on the inner side of the carrier material using at least the first mold part; and
   creating a texture on an inner face of the inner layer so as to aid adhesion of the inner face to a bladder to be disposed in the interior of the ball.

2. The method of claim 1, wherein the carrier material remains within the first mold part during a time between the step of three-dimensionally molding the outer layer and the step of three-dimensionally molding the inner layer.

3. The method of claim 1, wherein three-dimensionally molding the inner layer is carried out such that the inner layer is enclosed by the carrier material at an outer face and at side faces of the inner layer.

4. The method of claim 1, wherein three-dimensionally molding the outer layer is carried out such that the inner layer is enclosed by the outer layer at an outer face and at side faces of the inner layer.

5. The method of claim 1, wherein the inner layer is at least partially molded by a third mold part that is not used for three-dimensionally molding the outer layer.

6. The method of claim 5, wherein material for the inner layer is applied to the carrier material through the third mold part.

7. The method of claim 1, wherein the inner layer comprises a polymer selected from the group consisting of: polyurethane and expanded thermoplastic polyurethane.

8. The method of claim 1, wherein material for the outer layer is applied to the carrier material through the first mold part.

9. The method of claim 1, wherein the outer layer comprises transparent polyurethane.

10. The method of claim 1, wherein a structure element is inserted into the mold before three-dimensionally molding the outer layer.

11. The method of claim 1, further comprising three-dimensionally molding the carrier material within the mold.

12. The method of claim 11, wherein three-dimensionally molding the carrier material comprises at least one of:
   suctioning of the carrier material to at least one of the first mold part, the second mold part, or a third mold part,
   pressing with a die element, and
   deep-drawing in the mold.

13. The method of claim 1, wherein the method further comprises printing on the carrier material.

14. The method of claim 1, wherein the method further comprises creating textures on at least one of: the outer side of the carrier material, the inner side of the carrier material, and an outer face of the outer layer.

15. The method of claim 1, wherein the texture is at least partly created by a mold part comprising corresponding mold part textures.

16. The method of claim 1, wherein at least one of the first mold part and the second mold part comprises exchangeable inserts.

* * * * *